Oct. 23, 1934. H. L. WALKER 1,978,377
OIL WELL GUSHER CONTROL REGULATOR
Filed Sept. 11, 1933 2 Sheets-Sheet 1
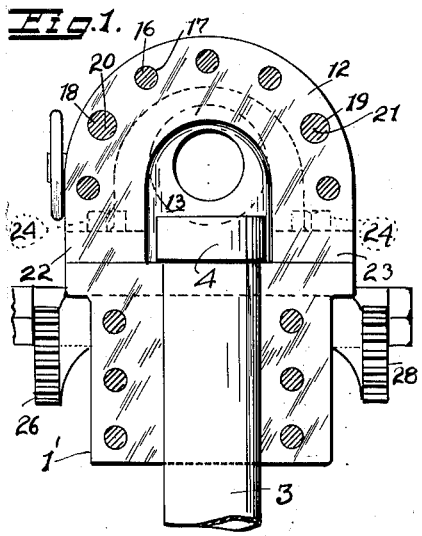
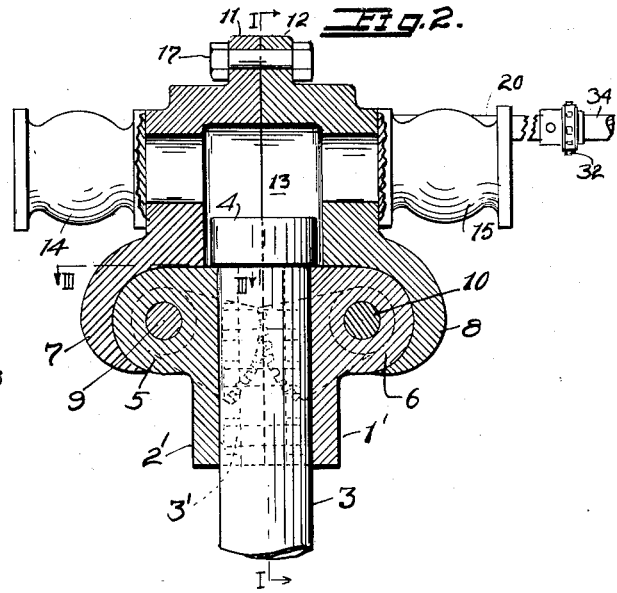
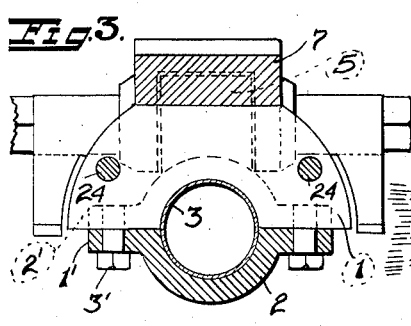
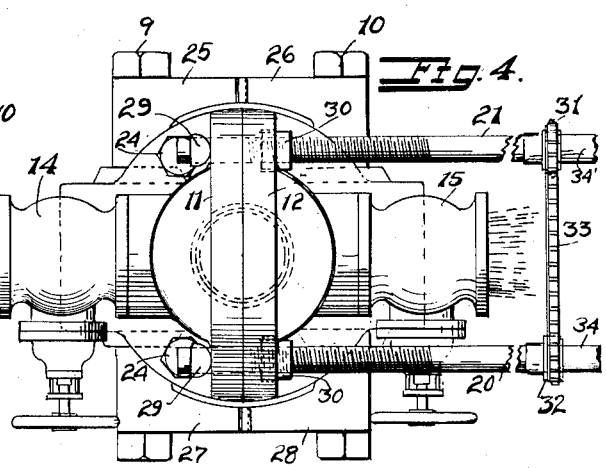
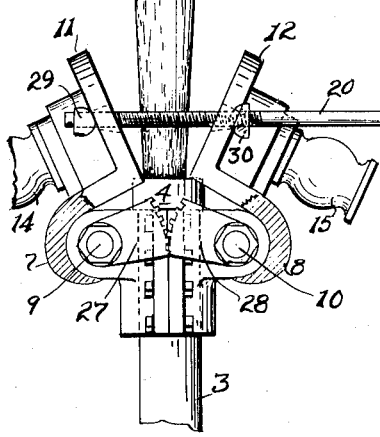
INVENTOR.
H. L. Walker.
BY John H. Morgan
ATTORNEY.

Oct. 23, 1934. H. L. WALKER 1,978,377
OIL WELL GUSHER CONTROL REGULATOR
Filed Sept. 11, 1933 2 Sheets-Sheet 2

INVENTOR.
H. L. Walker
BY John H. Morgan
ATTORNEY.

Patented Oct. 23, 1934

1,978,377

UNITED STATES PATENT OFFICE 1,978,377

OIL WELL GUSHER CONTROL REGULATOR

Hardie L. Walker, Oakland, Calif.

Application September 11, 1933, Serial No. 688,919

6 Claims. (Cl. 166—15)

This invention relates to oil well gusher control regulator in that class in which the flow of oil or gas is diverted and finally controlled, or regulated, and the object of my invention is to provide means for diverting the flow of oil or gas on each side of the casing pipe laterally, and means for closing the outlet of the lateral flow after the gusher has blown, and is out of control.

Another object is to provide means for attaching the control fittings on the pipe after the gusher blows, and to divert the vertical flow to one or more lateral streams by remote control, allowing for the control of the lateral streams at the pipe.

Another object of the invention is to provide simple and strong construction, and means to securely fix the fittings on the pipe with the gusher in action.

It is well known in this branch of engineering that an oil well gusher out of control is a wasteful, dangerous, and expensive problem before it can be brought under control in the usual way.

Other objects of the invention will appear to those familiar with, and skilled in this art as the description progresses.

An embodiment of the invention is shown in the accompanying drawings in which the same reference numeral is applied to the same portion throughout the several views, and of which there may be modifications.

Figure 1 is a section taken between the flanges of the housing.

Figure 2 is a sectional view taken on line 2—2 of Figure 1.

Figure 3 is a sectional plan view taken on line 3—3 of Figure 2.

Figure 4 is a plan of the fittings with the housing closed.

Figure 5 is a side view on a smaller scale, showing the housings set in their open position with the means of remote control, and showing the gusher in action.

Figure 6:
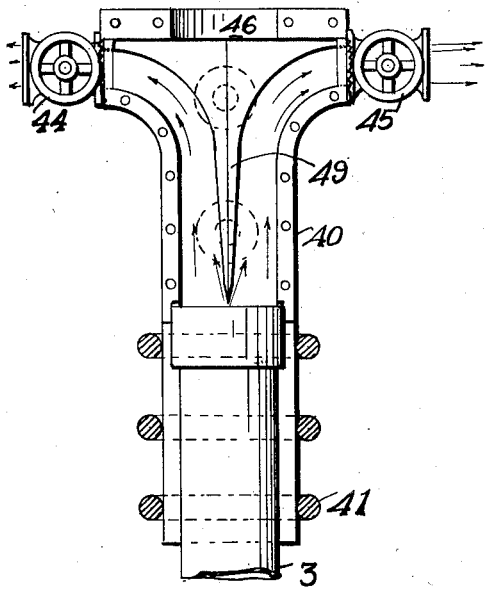
Figure 6 is a modified form of the invention showing the cover plate removed to show how the sliding gate acts to split the gusher stream and divert it into two lateral streams.

The numerals 1 and 2 indicate the two halves of the attachable clamp that is adapted to be attached and securely clamped to the pipe 3 of the oil well, just below the coupling 4 of the pipe by means of flanges 1' and 2' and bolts 3'. The clamps have the lugs 5 and 6 to which are hinged the housings 7 and 8 by means of the bolts 9 and 10. The housings have flanged meeting faces 11 and 12, and there are recesses in the housings to form a closed chamber 13 when the flanges are together. Communicating with this chamber are the valves 14 and 15. The flanges are provided with holes 16 for the bolts 17. There are also holes 18 and 19 somewhat larger than the flange bolts for the operating rods 20 and 21, the holes being somewhat conical to allow for the swing of the housings when opening and closing. The housings also have the flanges 22 and 23 adapted to be bolted to the clamp member by the bolts 24 when the housings are in the closed position.

Fixed on the bolts 9 and 10 are the gear segments 25 and 26 and 27 and 28 so that the housings will close evenly together. The operating rods 20 and 21 have the rounded collars 29, and the threaded nut 30 on the threaded rods, the nuts being set into the flanges to prevent them from turning when the rod is turned to draw the housings together.

The rods have the sprockets 31 and 32 fixed thereon, and a chain 33 passes over the two sprockets so that the rods can be turned in unison.

For means adapted to turn both rods considerable distance from the well, the rods being on each side of the gusher stream the rods 34 and 34' are connected to the rods 20 and 21 in any suitable way; in this instance provision is made to utilize the drill rods which were used in making the well so as to avoid extra expense for the purchase of special rods for this purpose. The rods are mounted on suitable stands, and means are provided for turning the rods.

In operation in the event of a gusher, the clamp fittings are secured in place under the coupling of the pipe, the hinged housings being open on each side of the gusher stream. The operating rods are now mounted in place, and the chain placed on the sprockets, the drill rods are connected and mounted, the valves 14 and 15 being open, the rods are turned in unison to gradually bring the two housings together acting to shut off the gusher and divert it through the valves 14 and 15. After the flanges are brought together the bolts are put in the flanges and drawn up securely, also the bolts 24 turned up to hold the housings down on the clamp members. Now one of the valves may be closed and pipes connected to lead the oil to a storage tank, after which the valve is opened and the other valve closed and connected in the same way, after which the valves are both opened and the gusher is under control.

Figure 7:
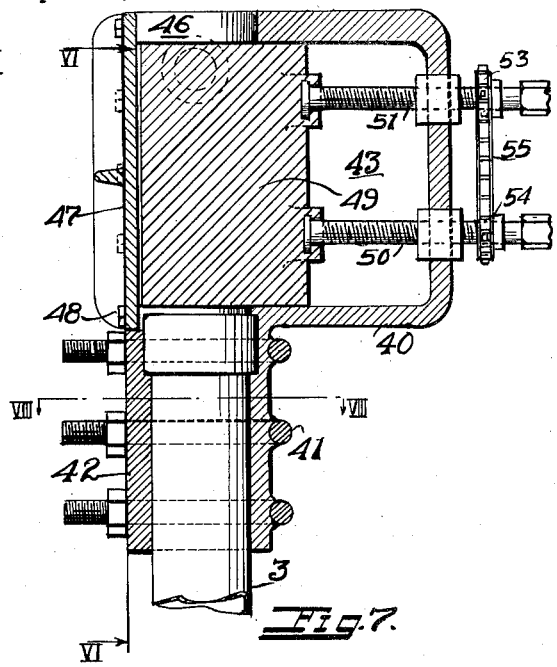
Figure 7 is a section on line 7—7 of Figure 6.
Figure 8:
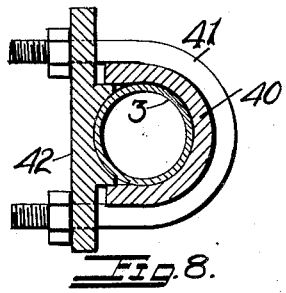
Figure 8 is a section on line 8—8 of Figure 7.

In the modified form of the invention shown in Figures 6, 7 and 8 the housing 40 is in one piece clamped under the coupling of the pipe by means of the U bolts 41 and the plate 42. The housing has the chamber 43 to which is connected the valves 44 and 45, and there is an opening 46 in the top of the chamber in alignment with the pipe 3 so that the gusher does not touch any part of the housing. There is a cover plate 47 secured by bolts 48 to the housing. Mounted in the housing is the horizontally slidable gate member 49, having a sharp edge at the bottom, and on the front face so as to form a wedge like entering gate into the gusher stream. The gate flares on each side of the bottom edge to split and divert the stream into two streams to the valves.

The gate is operated by the screws 50 and 51, which are connected to the drill rods for remote control similar to the first described form. The rods are turned in unison by means of the sprockets 53 and 54, and chain 55, the above arrangement being made to keep the screws turning in unison so that they can be operated by remote power independently.

In operation the housing is slid over the pipe horizontally so as to have a shoulder under the pipe coupling, the U bolts and plate 42 in place and clamped up tight. Now the plate 47 is secured in place thus enclosing the gusher, but not interfering with it in any way, the valves are opened, and the regulator is ready for remote control through the drill rods. As the rods are turned the gate is forced into the gusher stream acting to split it and divert it to the valves and thus bring the gusher under control.

From the description of the embodiments of the invention it will be seen that a very efficient means for the control of gas or oil well gushers has been evolved.

Having thus described my invention what I desire to secure by Letters Patent of the United States is as follows, but modifications may be had in carrying out the invention as shown in the drawings and in the particularly described form thereof within the purview of the annexed claims.

I claim:

1. An oil gusher control regulator of the class described comprising clamping means in two parts, lugs on said parts, pins in said lugs, housings on said pins, means to draw said housings together to form a closed chamber over the end of a pipe, and outlet valves for said chamber.

2. An oil well gusher control regulator of the class described comprising a clamp in two parts adapted to clamp on the pipe of an oil gusher below the coupling of said pipe, a hinged housing on each of said parts, each of said housings hinged on, and secured by a pin to said part, a recess in each housing adapted to form a closed chamber when the housings are brought together, valves connected to said chamber, and threaded rods to bring the two housings together by remote control.

3. An oil well gusher control regulator of the class described comprising a clamp in two parts adapted to clamp on an oil well pipe below the coupling thereof, a hinged housing on each of said parts, a recess in each of said housings adapted to form a closed chamber in said housings, valves connected to said chamber, threaded rods on each side of the flow of oil from said pipe in said housing, and means to turn both of said rods simultaneously to bring said housings together to divert the flow of oil into two lateral streams, and means to shut off said streams.

4. An oil well control regulator of the class described comprising clamp members adapted to clamp on an oil well pipe to form an upper surface surrounding said pipe under the coupling member of said pipe and projecting therefrom, a housing member hinged on each of said clamp members and having flanged surfaces adapted to meet above the pipe, recesses in said hinged members to form a chamber above the end of the pipe, a lower surface on said hinged housings adapted to clamp down on the upper surface of the clamp members when closed, a threaded rod on each side of said pipe adapted to open or close said hinged housings, a valve on each housing connected to said chamber, and means to operate said threaded rods simultaneously.

5. An oil well control regulator of the class described comprising a pair of clamp members having flanged meeting faces adapted to clamp on a pipe adjacent the end thereof, lugs on said clamp members, pins in said lugs, a housing fixed on each of said pins, recesses in said housings to form a closed chamber when said housings are together, an opening to each of said recesses, valves for said openings, gear segments fixed to said pins and in mesh with each other whereby the housings will move in unison, threaded rods in aligned openings in said housings, nuts on said rods whereby the housings may be opened or closed, means to turn both of said rods simultaneously, and means to extend said rods for remote control of said housings.

6. An oil well gusher control regulator of the class described comprising flanged clamp members adapted to clamp on each side of an oil well pipe under the coupling member of said pipe to form a horizontal surface on the upper side of said clamp members, lugs projecting from said clamp members, pins in said lugs, housing members hinged and secured by said pins, recesses in said housings to form a chamber above the end of the pipe, flanged faces on said housings, aligned holes in said flanges, screw threaded rods in certain of said holes, nuts on said rods held from turning on said flanges, collars on said rods whereby the turning of the threaded rods will bring the flanged faces of said housings together, means to turn the threaded rods simultaneously, bolts to secure said flanged housings together, outlets from said chamber, and valves to control said outlets.

HARDIE L. WALKER.